Feb. 25, 1947.  J. H. WILSON  2,416,559
APPARATUS FOR MOLDING AND HANDLING CONCRETE SLABS
Filed Sept. 4, 1945  9 Sheets-Sheet 1

John Hart Wilson
INVENTOR
BY
Wayland D. Keith
HIS AGENT

Feb. 25, 1947.    J. H. WILSON    2,416,559
APPARATUS FOR MOLDING AND HANDLING CONCRETE SLABS
Filed Sept. 4, 1945    9 Sheets-Sheet 2
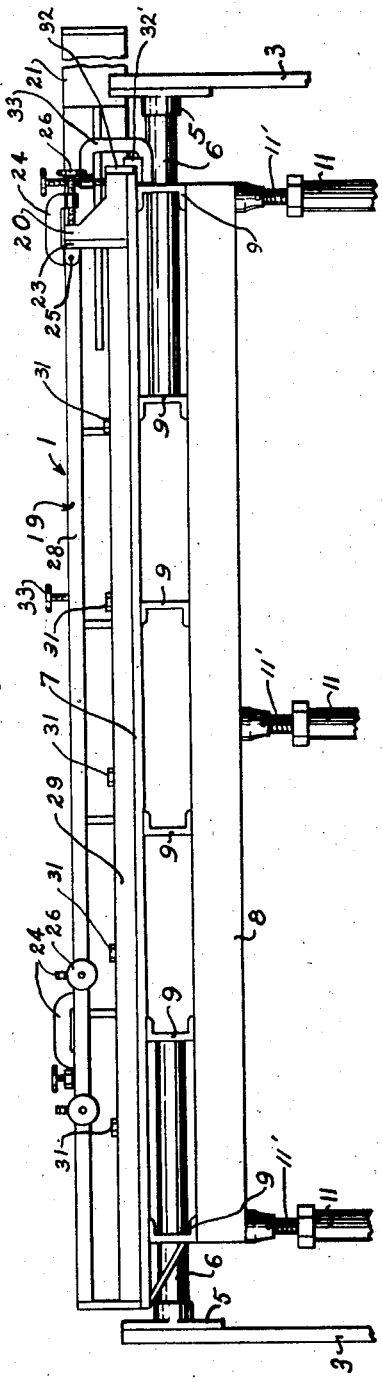
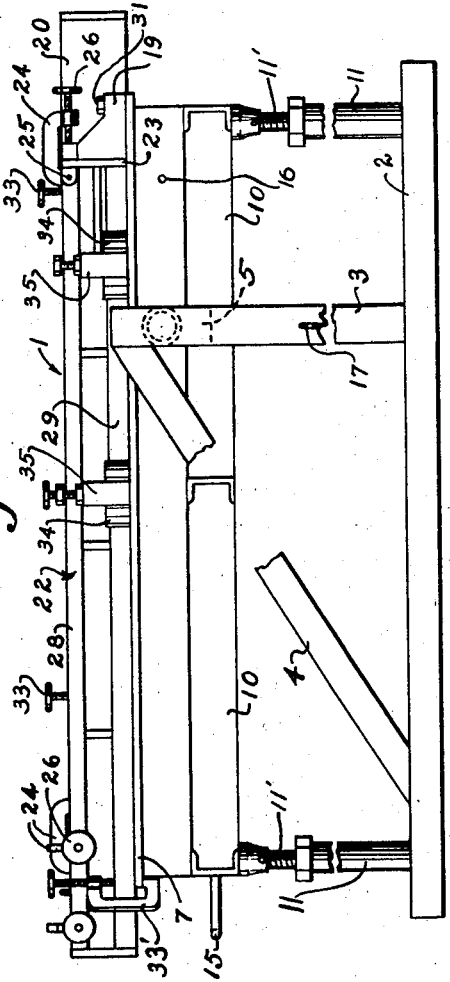
John Hart Wilson
INVENTOR.
BY Wayland D. Keith
HIS AGENT.

Feb. 25, 1947.  J. H. WILSON  2,416,559
APPARATUS FOR MOLDING AND HANDLING CONCRETE SLABS
Filed Sept. 4, 1945  9 Sheets-Sheet 3
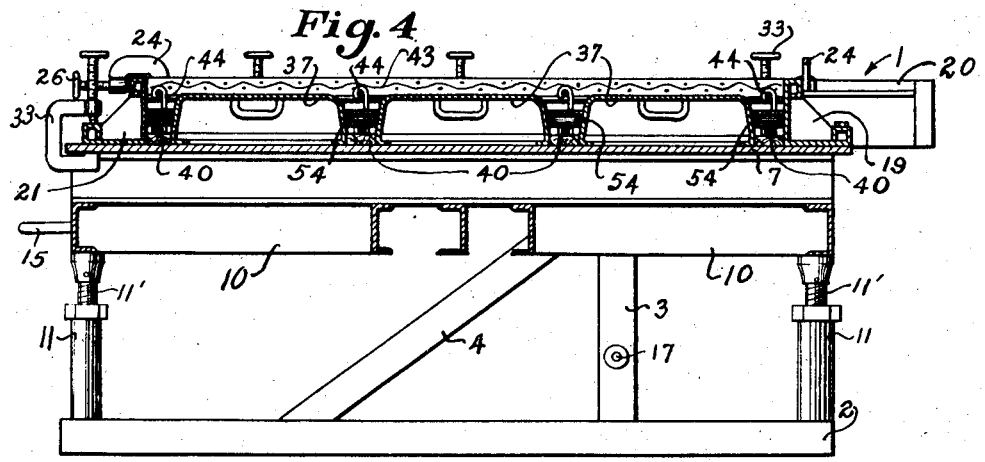
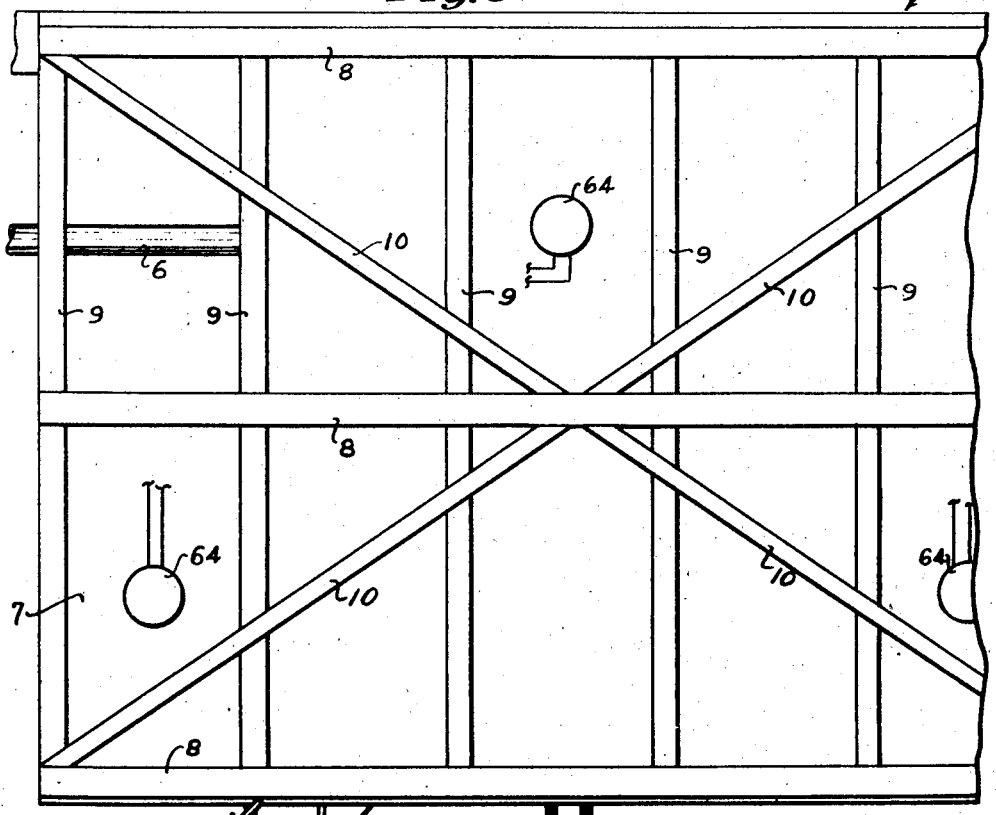
John Hart Wilson
INVENTOR.
BY
Wayland D. Keith
HIS AGENT.

Feb. 25, 1947.  J. H. WILSON  2,416,559
APPARATUS FOR MOLDING AND HANDLING CONCRETE SLABS
Filed Sept. 4, 1945  9 Sheets-Sheet 4
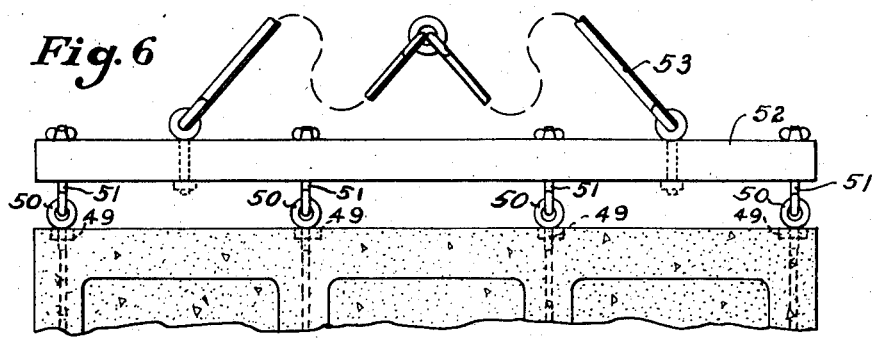
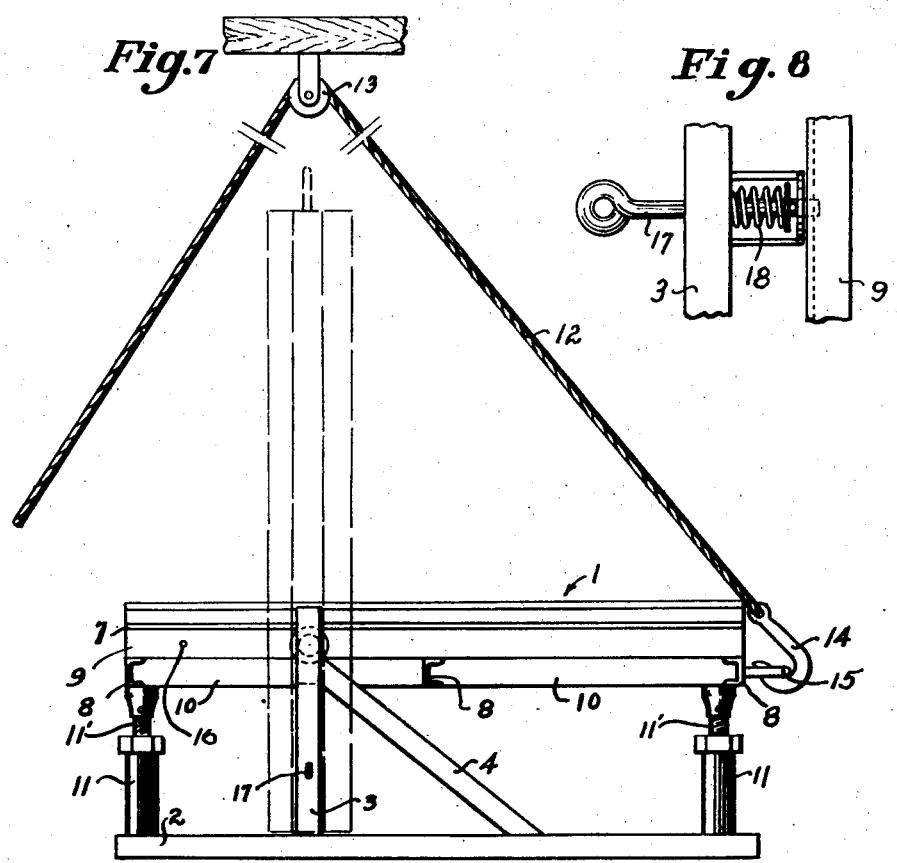
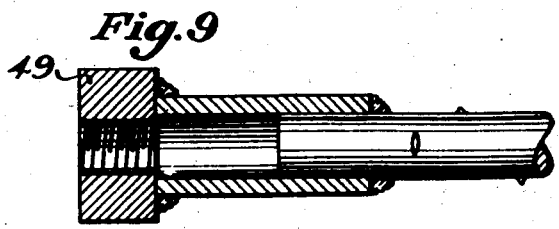
John Hart Wilson
INVENTOR.
BY
Wayland D. Keith
HIS AGENT.

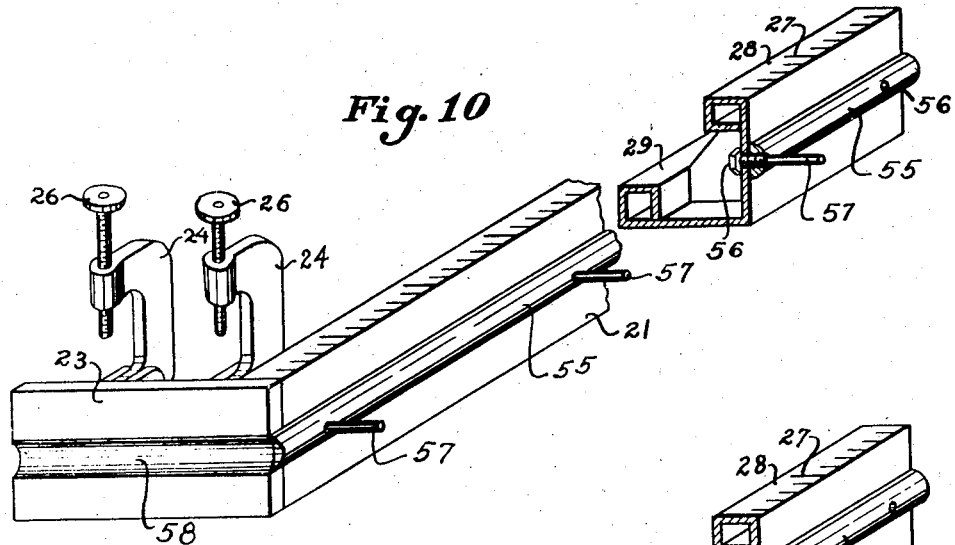
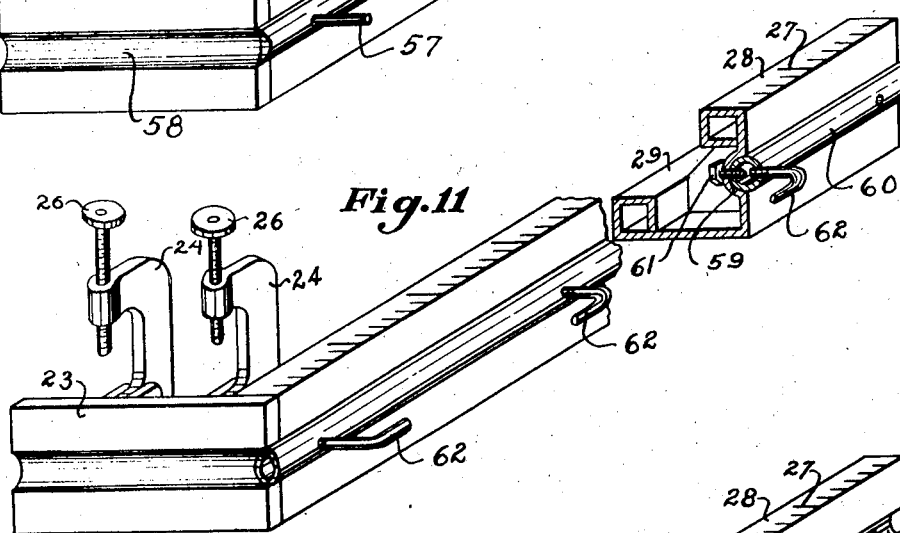
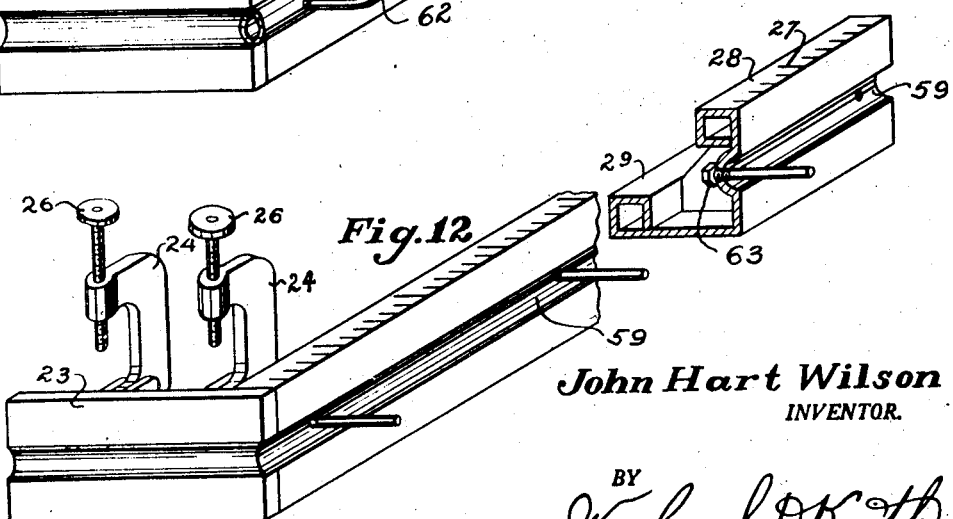

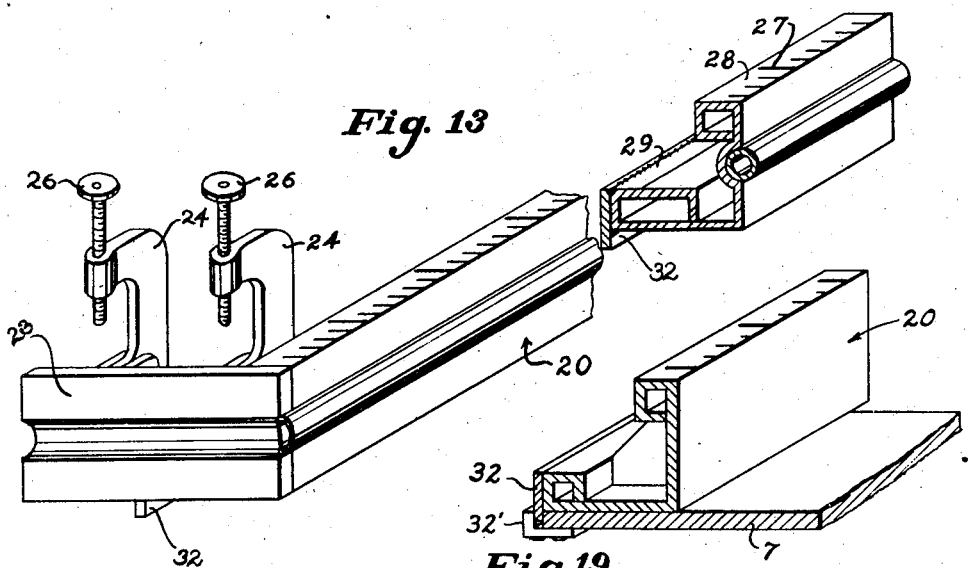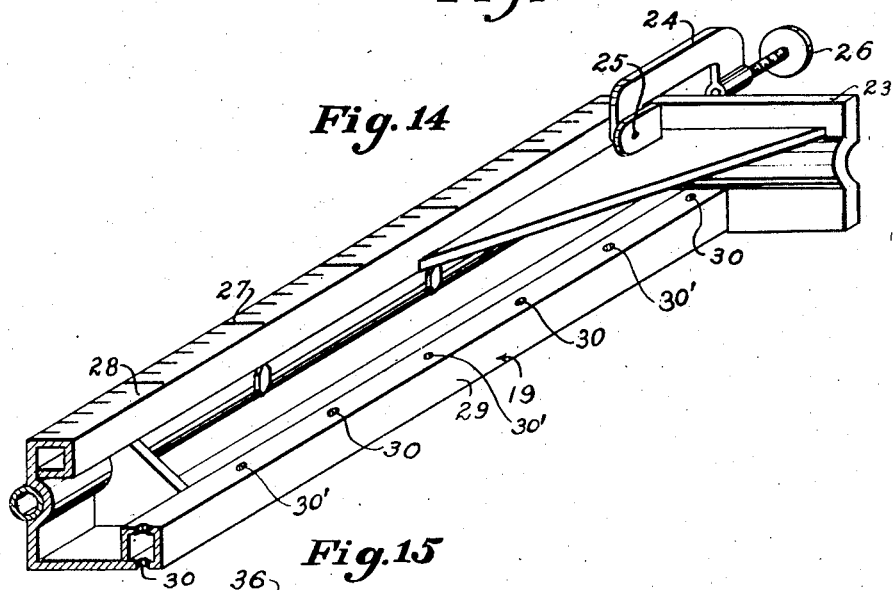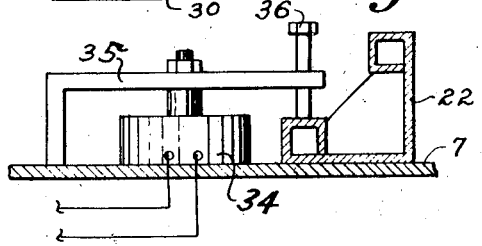

Feb. 25, 1947.　　　　J. H. WILSON　　　　2,416,559
APPARATUS FOR MOLDING AND HANDLING CONCRETE SLABS
Filed Sept. 4, 1945　　　9 Sheets-Sheet 7
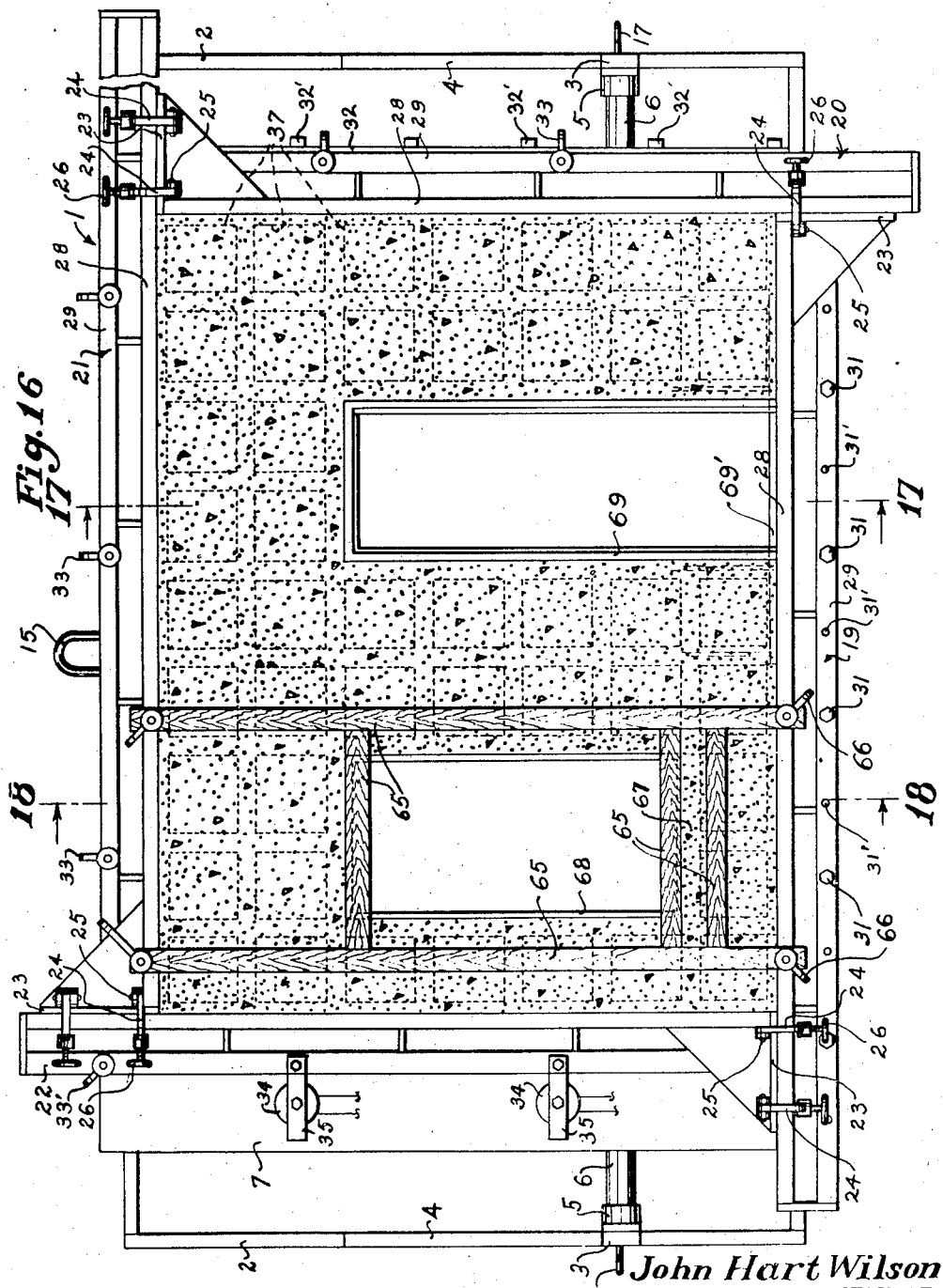
John Hart Wilson
INVENTOR.
BY
Wayland D. Keith
HIS AGENT.

Feb. 25, 1947.  J. H. WILSON  2,416,559
APPARATUS FOR MOLDING AND HANDLING CONCRETE SLABS
Filed Sept. 4, 1945  9 Sheets-Sheet 8

John Hart Wilson
INVENTOR.

BY Wayland D. Keith
HIS AGENT

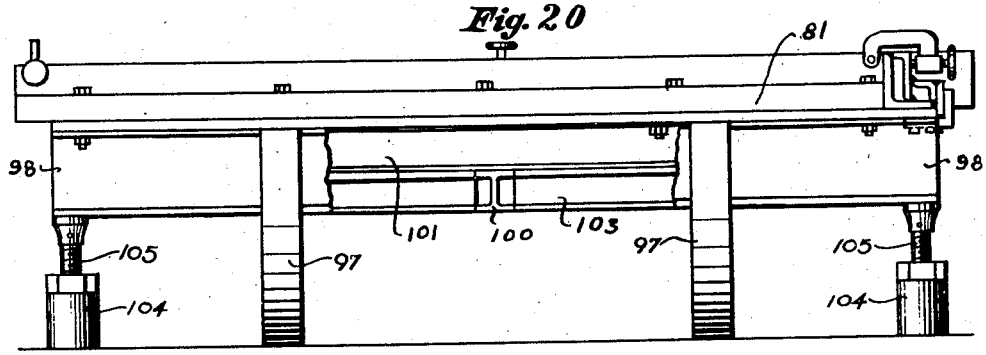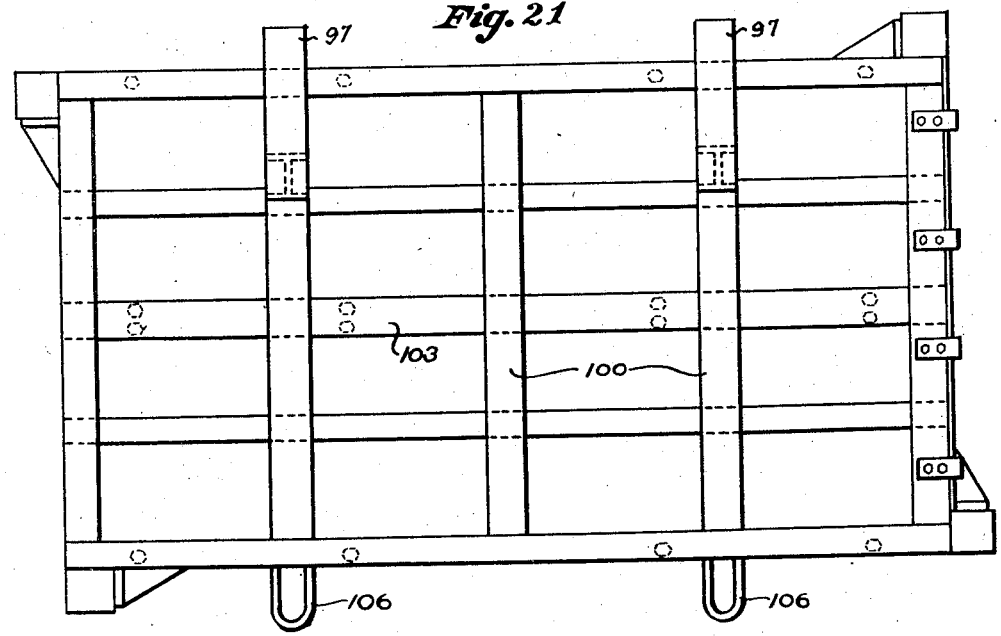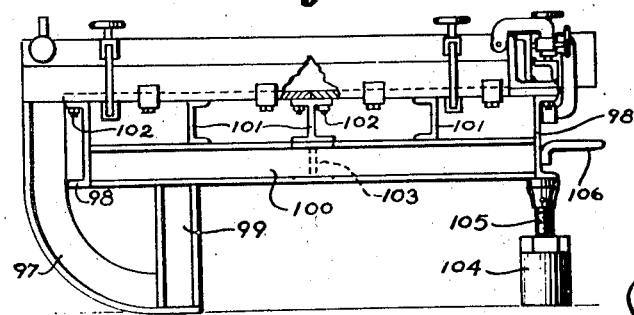

Patented Feb. 25, 1947

2,416,559

UNITED STATES PATENT OFFICE 2,416,559

APPARATUS FOR MOLDING AND HANDLING CONCRETE SLABS

John Hart Wilson, Wichita Falls, Tex.

Application September 4, 1945, Serial No. 614,293

9 Claims. (Cl. 25—121)

This invention relates to improvements in apparatus for molding and handling concrete slabs, and more particularly to the molding and handling of such slabs as may be used to form building structures.

Various molding procedures for building slabs have been proposed heretofore, but these, for the most part, have been crude in construction, complicated and expensive to produce, cumbersome to use, unsatisfactory in the results produced, time consuming in the formation thereof, and limited in adaptation.

The primary object of this invention is to provide a molding apparatus on which concrete or plastic slabs may be molded, which molding apparatus has one fixed side and the other sides adjustable, so that the slabs may be constructed in various sizes or any number of identical slabs may be produced.

Another object of this invention is to provide apparatus for molding concrete slabs of the character used for building structures, which provides for the speedy and accurate molding of such slabs with a minimum of time and effort.

A further object of this invention is to provide apparatus for molding concrete building slabs, which slabs may be removed from the mold and handled before completely cured, said building slabs being allowed, preferably, to cure in the position they are to assume in the building structure.

In carrying out these objects, I provide an improved apparatus for molding and handling concrete slabs which includes a molding table on which the concrete or plastic slabs may be formed, which table is constructed with one fixed side form and with the other side forms adjustable relative to each other and to the fixed side form upon the face plate of the molding table. In this manner the molding table may be adjusted to provide for any number of slabs of the same dimensions, or the mold may be set to produce slabs varying in size, and which slabs may be removed from the mold as soon as the concrete or plastic is sufficiently set about the reinforcing members to be handled by a sling member attached to certain of the reinforcing members. The slabs may be removed from the molding table to a suitable curing rack, with slabs that are to be positioned horizontally in the building, preferably to be cured in a horizontal position, and slabs that are to be used in a vertical position are preferably cured in a vertical position, thus the green slab adapts itself to the stress that it will ultimately receive and seasoning cracks will be lessened or avoided.

The molding table may be provided with molding pans suitably positioned thereon to provide recesses in the slabs to reduce the weight of the slab and to provide space therein for other structural features, such as insulation. The table is to be so constructed and mounted as to be in horizontal position when the concrete is poured to form the slab, but it may be raised to a vertical position, as soon as the concrete of the slab is sufficiently set to be removed therefrom, before the concrete is completely cured, thus permitting the molding table to be ready for prompt reuse, without the necessity of waiting for the complete curing thereof.

Slabs that are to be used in a horizontal position, such as floor or ceiling slabs, are preferably removed from the mold in a horizontal position and racked to cure in such position, for the reasons above stated. The molding apparatus is so constructed as to form a concrete slab with lifting means for attaching a supporting device to the respective slabs as formed, so as to lift them from the table, the support attaching means being a permanent part of the slab, which will facilitate the handling thereof at any time.

For pouring the slab, the molding table is held in a horizontal position and for the best results, it should be adjusted so as to provide a perfectly level surface upon which to pour the liquid concrete, within the mold cavity. Therefore means for adjusting and holding the molding table in a perfectly level horizontal position have been provided.

The apparatus is so constructed, according to this invention, as to produce slabs that are perfectly rectangular in form, with accurately formed right angle corners, which slabs will interfit accurately with other slabs for building purposes and adapted to coact therewith. By adjusting the molding apparatus to accommodate slabs of different sizes, as is possible herein, any desired number of identical slabs may be produced accurately and uniformly with one setting of the apparatus, or many slabs of the same dimensions but of different character or for different applications may be produced.

It is also possible, according to this invention, to mold slabs for various parts of the building, either side walls, or portions thereof, ceiling, floor, or roof slabs. Wall and partition slabs may have the window or door frames positioned within the mold and the concrete poured therearound, thus such window or door frames are molded in and become integral with the building slab, and are formed in the slabs as designated by the building plan. Provision is also made, during the molding of the slab, to provide openings for conduits for bolts, electrical wires, pipes and other constructional features and characteristics as desired in the completed building.

These and other features of my improved apparatus are included in a preferred embodiment thereof, which, together with modifications thereof, are set forth in the accompanying drawings, in which:

Fig. 2 is a front elevation thereof, with the lower part of the stand broken away;

Fig. 3 is an end elevation of the molding apparatus;

Fig. 4 is a cross section on the line 4—4 of Fig. 1;

Fig. 5 is a fragmentary bottom plan view of the molding table;

Fig. 6 is a fragmentary side elevation of slab lifting means attached to the slab;

Fig. 7 is an end elevation of the molding apparatus showing the pivotal tilting means applied thereto;

Fig. 8 is a fragmentary detailed elevation of the table locking bolt;

Fig. 9 is a detailed sectional view of a reinforcing rod end connection;

Fig. 10 is a perspective view, with a part broken away, and showing a molding side form;

Fig. 11 is a similar view of a modified form thereof;

Fig. 12 is a similar view showing another modified form thereof;

Fig. 13 is a similar view showing a longitudinally slidable end form;

Fig. 14 is a perspective view partly in section showing a stationary side form;

Fig. 15 is a fragmentary section through a side form showing a magnetic clamp therefor;

Fig. 16 is a plan view of the molding apparatus adapted for molding window and door frames into the slab;

Figure 19 is a perspective view, partly in section of a fragmentary portion of the molding plate and the longitudinally slidable side mold form member.

Fig. 20 is a front elevational view of the modified form of molding table;

Fig. 21 is a bottom plan view thereof; and

Fig. 22 is an end elevational view thereof with parts broken away and in section to show the details of construction.

The molding apparatus which comprises this invention and a modification thereof comprises a molding table generally designated by the numeral 1 which is preferably mounted for movement into different positions, such as a horizontal position for pouring the slab, and which slabs may be removed therefrom in this position by the handling apparatus, or, if desired, the table may be moved into a substantially upright position to facilitate the removal of the slabs therefrom by the handling apparatus and for transporting them in this position to a suitable curing rack before they are directed to the site of use.

Figure 1:
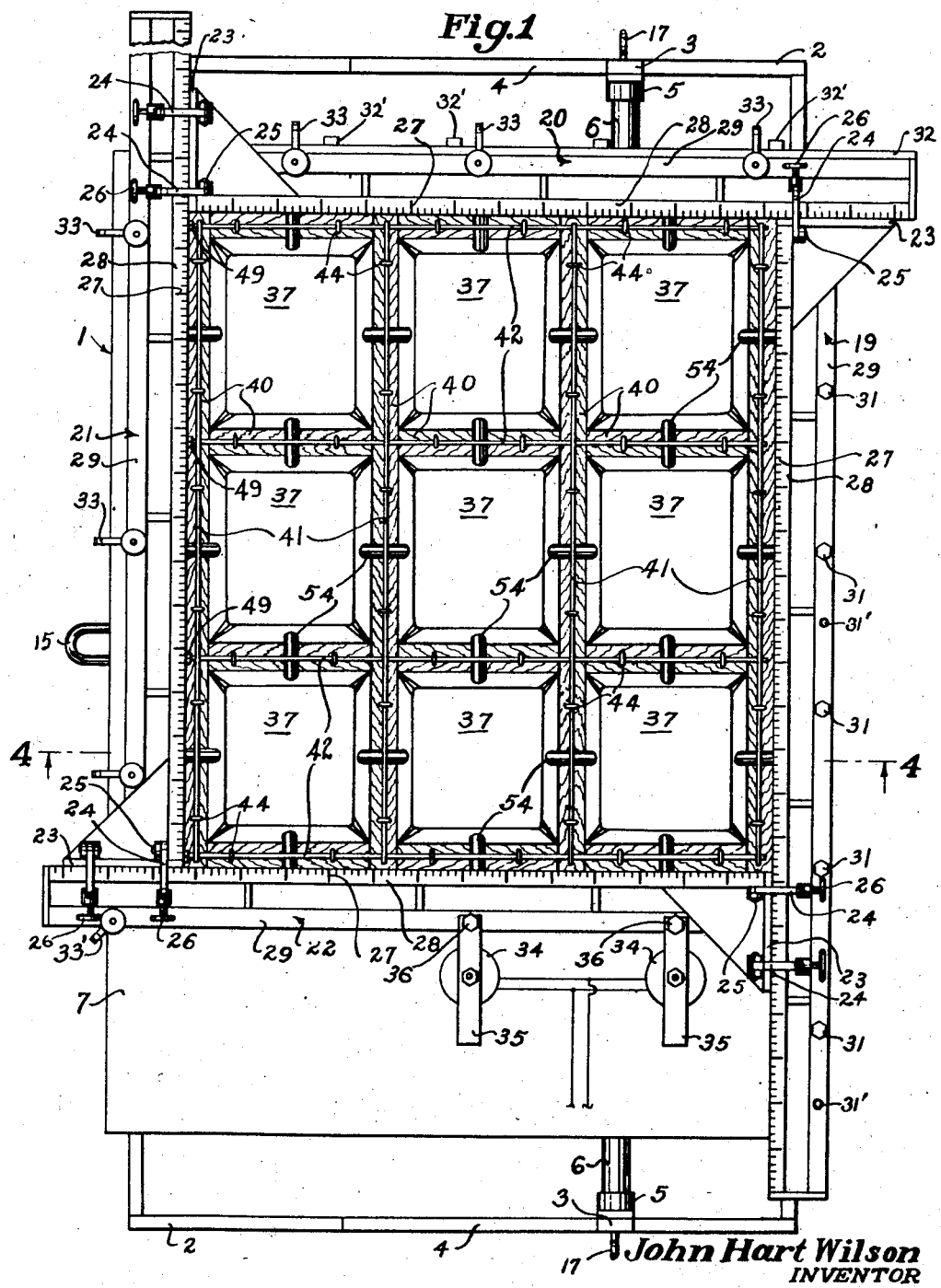
Fig. 1 is a top plan view of the molding apparatus showing this in position to receive the concrete material preparatory to molding the slab.

The table, therefore is preferably mounted on a base structure which is shown as formed by sills 2, extending transversely of the table, and has a pair of upright standards 3 spaced outwardly from the opposite ends of the table as shown particularly in Figs. 1 and 2. These standards 3 are held rigidly in upright positions by diagonal braces 4, so as to form a secure support for the table and to permit movement of the latter relative to this base structure.

The upper end portions of the standards 3 have bearings 5 fixed thereto (Fig. 2), in which bearings are journaled the outer ends of trunnions 6. The trunnions 6 are fixed to the molding table 1 and form pivotal supports therefor in the bearings 5.

The molding table 1 is constructed preferably with a molding plate 7, the upper surface of which is smooth, so as to provide a smooth or level surface to receive the molding pans and furring strips, as will be more fully described hereinafter. This molding plate 7 is formed preferably of a plate metal, such as steel, and is of sufficient thickness and rigidity to accommodate the slabs to be formed thereon. It is also braced securely by longitudinal and transverse sill members 8 and 9, respectively, arranged in crossed relation, as shown in Figs. 2 and 3, which sill members may be formed of structural steel, such as channel beams, and the longitudinal sills 8 may be braced further by diagonal bracing 10, (Fig. 5), which prevents distortion of the mold, thereby providing a perfectly flat surface on which to produce a perfectly flat slab surface. These structural members are rigidly secured together as by welding, so as to form a strong and rigid frame structure for reinforcing the molding plate 7 for supporting the mold and the concrete slab formed thereon. The trunnions 6 are shown as extending longitudinally of the table and as being welded or otherwise rigidly secured to the transverse sills 9, as is evident in Fig. 2.

Thus a secure support is formed for the table, which, nevertheless, allows for pivotal movement thereof from its horizontal position, as illustrated in Figs. 3 and 7, to an upright position, as shown in broken lines in Fig. 7. The pivotal support is disposed laterally from the transverse center of the table, and the heavier side thereof is supported normally by supports 11 disposed at spaced intervals along the length of the table, and having a screw threaded adjustment member 11' provided at the top of each support 11, Figs. 2, 3 and 4. These adjustable members 11' make possible accurate leveling of the heavier side of the molding plate 7. As illustrated in Figs. 2 and 3, the members 11—11' are received by an edge of the table thereon. In this manner the molding table is securely held in the horizontal position while the form is being made up and while the slab is being poured into the mold cavity, but can readily be moved into the upright position, preferably by means of a mobile crane. Whether the table be moved between the positions shown, by power means or manually, depends upon the weight of the formed slab and other factors, and may be accomplished by means of a cable 12 extending over a pulley 13 above the table and having one end attached to a hook 14. The hook 14 is adapted to be engaged with an eye 15 secured to an edge of the table that rests upon the support 11—11'. Thus, upon drawing in the cable 12, the table may be moved from the full line position shown in Fig. 7, to the broken line position shown therein.

Provision is made for anchoring the table in its upright position during the separation and removal of the slab therefrom. This is accomplished by forming holes 16 in the transverse sill members 9 (Figs. 3 and 7) in position to receive slide bolts 17 (Fig. 8). The slide bolts 17 extend through the upright standards 3 and are slidably mounted therein, and normally are urged inward by coiled springs 18 sleeved thereover, urging the bolts inward with their inner ends in position to engage the holes 16 formed in the transverse braces 9. This locks the table in upright position, but permits it to be released by withdrawing the slide bolts 17 from the holes, when another molding operation is to be performed.

Referring to Fig. 1, the molding plate 7 has mounted thereon a plurality of side forms 19, 20, 21, and 22, respectively, shown as four in number, for molding a rectangular slab. Each of the mold side forms shown is elongated and adapted to mold a side edge of the slab, and to forming a slab with right angle corners. The respective mold side forms should be arranged accurately at right angles to each other and held in this relation. Accordingly, each of the mold side forms 19–22 is provided with an angle bracket 23 extending laterally at a right angle from the inner face of the form a sufficient distance to abut against the inner face of the adjacent form and hold the latter accurately at right angles to the former. These parts may be secured in right angle relation and in adjusted positions with respect to each other by means of C-clamps 24, pivotally mounted at 25 at the end of one form adjacent the bracket 23 and with an opposite end provided with a hand screw 26 in position to hold the adjacent form in abutting relation against the bracket 23 and in secure adjusted position with respect thereto.

Since the movable side forms are adapted to be adjusted relative to each other for molding slabs of different sizes, each of the side forms has graduations along the upper edge thereof, as indicated generally at 27. The graduations on one side form cooperate with those of the adjacent form to indicate the length of the slab to be molded thereby.

While the mold side forms 19–22 may be constructed in any desired manner to provide an effective confining structure for the concrete, it is preferable to shape each of these forms from structure steel, because of its rigidity and strength, and it is preferable to have them substantially the shape as shown in Figs. 10 to 14. As illustrated therein, each of the forms is shaped from sheet metal stock, with in-turned edges, designated generally at 28 and 29, respectively, Fig. 10, and formed on the upright and horizontal portions of the respective form. This provides a rigid base adapted to be seated directly upon the smooth upper surface of the molding plate 7, with the horizontal base edge thereof stiffened, as well as the upper edge of the side form. This in-turned edge 28 also provides a surface to receive the graduations 27 thereon.

Since for all practical purposes, the slabs will be formed rectangular in shape, and any irregular or specially formed slabs will be blocked in on the regular mold form, the slab mold form is set up on the molding plate 7, which is a rectangle, braced and cross braced and supported in the horizontal position so that it will not become distorted or misaligned from the true level position. The upstanding mold side forms must be held perpendicular to the surface of the molding plate 7 and at right angles to each other. The mold side form 19 is rigidly secured to an upper edge of the molding plate 7 and has holes 30–30' through the in-turned edge 29 thereof to receive bolts and dowels 31–31', respectively. The bolts 31 secure this mold side form 19 fixed to an edge of the mold plate, but allow it to be removed therefrom, as when removing a slab in the horizontal position, and with the holes 30' receiving dowel pins 31', accurate resetting is always assured.

The mold side form 20 has a flange 32 faced against a machined edge of the mold plate 7, which mold side form 20 is movable longitudinally along the edge of the mold plate 7 and may be set in adjusted position to determine the width of the slab mold form. This mold side form 20 is held in adjusted position on the edge of the mold plate 7 by C-clamps 33 and to the fixed mold side form by C-clamps 24. Upstanding projections 32' engage the outer surface of flange 32 in contact relation with the machined edge of the molding plate 7.

After the mold side form 20 is adjustably secured to the mold plate 7 to give the proper width to the slab to be molded, the mold side form 22 is positioned opposite and parallel to the mold side form 20 on the upper surface of the molding plate 7, and is transversely movable thereon toward and away from the side 20. This mold side form 22 is fixed to the molding plate 7 by C-clamps 33' or by magnetic clamps 34—36, so as to give the proper length to the slab to be molded.

With the mold side forms 20 and 22 secured in adjusted position, the mold side form 21 is positioned on the upper surface of the molding table 7 parallel to the fixed mold side form 19 and is set so that the graduations 27 on opposite sides correspond. The mold side form 21 is then secured to the molding plate 7 and to the adjacent side forms in the same manner as the other side forms are secured.

Thus a strong, rigid, accurately formed, but adjustable mold cavity is formed to receive and mold the concrete poured thereinto.

The magnetic clamp comprises an electro-magnet 34, adapted, when energized, to be attached by the attraction thereof, to the metal molding plate 7, in a manner that will be obvious. The electro-magnet 34 is secured to an angle bar 35, one end of which is adapted to be drawn by the electro-magnet against the surface of the molding plate 7, while the other end of said bar carries an adjustable set screw 36 in position to engage the in-turned edge of the mold side form 22. The solenoid core of the electro-magnet 34, acting on the clamping bar 35 when energized, causes the clamp to secure the mold side form rigidly to the surface of the molding plate 7.

The form of apparatus shown in Fig. 1 is adapted to mold a rectangular slab and preferably is formed with a series of recesses in a surface thereof, so as to reduce the weight of the slab and to accommodate various structural features as desired. These recesses may be formed by molding pans generally designated at 37. These pans 37 are constructed substantially rectangular in shape with rounded corners, and may have inturned flange 38 around the open side thereof, which flanges stiffen this portion of the pan. The pans may be formed with a flat face 39 substantially the width of the furring strips, and perpendicular to the plate 7, or the taper may extend to the edge of the pan. The molding pans are positioned on the upper surface of the molding plate 7 and are held in spaced relation from each other and from the side mold forms by furring strips 40. The inturned edge of the pans fits snugly against the face of the molding plate 7 so that the liquid concrete will not flow thereunder, and the tapered sides of the pans facilitate their removal from the molded slab.

The furring strips 40, arranged flat on the upper surface of the molding plate 7, act as spacers between the molding pans 37 and between the pans and the upstanding side mold forms. When wooden furring strips are used, as is preferable when the slabs are to receive a finishing surface, they become embedded in the inner face of the molded slab and form a nailing portion for the securing of structural building parts and other members to the concrete slab, as well as wall board or lath for holding plaster and the like.

These furring strips 40 serve also to receive and support rod holders that may be driven therein and which holders serve to support reinforcing rods that are designated respectively at 41 and 42. The reinforcing rods may extend longitudinally and transversely of the slab mold and are preferably arranged in superposed relation to form an effective reinforcement for the slab that is molded therein, at the sides of the cavities formed by the pans 37 in the inner face of the slab. A wire mesh reinforcement, indicated at 43, Fig. 4, may be used also, if desired, and will extend through the plane of the formed slab.

The reinforcing rod supports are designated generally at 44, and have a staple portion 45. The staple portion 45 is adapted to be driven through the furring strip and to be clinched by contact with the upper surface of the molding plate 7. A spacer element 46 may be secured on the staple portion 45 to space the lower reinforcing rod a fixed distance above the furring strip. If desired the furring strips, rod supports and spacers, and reinforcing rods may be assembled into a unit before being placed within the mold form. Each of the rod supports has an upper and lower anchoring yoke 47 and 48 respectively adapted to receive the reinforcing rods therein and to be bent around the rod for securing these to the support. Thus the rods are held in elevated positions above the furring strips and will be surrounded by the concrete and become embedded therein.

The reinforcing rod supports are similar to each other, but the yokes designated at 47a and 47c are adapted to receive rods therein or to support screen mesh wire a spaced distance above the bottom of the mold form. The yoke 48a is adapted to receive a reinforcing rod so as to hold said rod a spaced distance above the furring strip 40.

The reinforcing rods 42 are shown as extended in Figs. 1 and 5 to points adjacent the side face of the mold slab, and some of these reinforcing rod fasteners, such as internally threaded nuts 49, rigidly fixed thereto (Figs. 6 and 9), in positions to be disposed at the edge face of the molded slab. The nuts 49 are adapted to receive eye bolts 50 threaded therein (Fig. 6), and to be interconnected with adjustable eye bolts 51 secured to a beam 52 which is attached to a sling 53. This forms an attachment for the molded slab which permits handling of the latter and facilitates loading for transportation in a vertical position, which is particularly desirable in the handling of wall slabs. While the nuts and eye bolts have been described for attaching the lifting means to the slab, it is to be understood that other suitable means may be used.

As stated above, the pans 37 will form recesses in one face of the slab, which recesses are separated by ribs. Provision is made for forming openings through these ribs, preferably as the slab is poured. In the form of the invention illustrated, these openings are molded by tubes 54 (Figs. 1 and 4) which are arranged in recesses 37' in bridging relation between the pans 37, and between the outermost pans and the adjacent mold side forms and are spaced slightly above the furring strips 40. These tubes 54 are placed in the mold before the concrete is poured, so that the concrete will flow therearound and mold the tubes in the ribs as they are formed, thereby forming openings through these ribs. These openings may be used for receiving bolts for securing adjacent slabs together, for the passing of electrical conduits and wires therethrough, pipes and other structural elements of the building. The recesses 37' are depressed at regularly spaced intervals in the sides of pans 37 and accurately hold the tubes 54 in alignment during the pouring of the concrete.

The outer edge of the molded slab may be formed smooth, if desired, or it may be formed with lengthwise ribs or grooves, as is preferable according to the side forms shown in Figs. 10 to 14.

As illustrated in Fig. 10, a slab may be molded with a concave groove in the edge thereof, which slab will be used in abutting relation with another, similarly formed slab, having a concave edge groove, the complementary grooves being adapted to receive a pipe that will serve as an anchor member or as an extra reinforcing member. Such a groove may be formed by attaching a half-round bar 55 on the inner face of the side mold form, illustrated as 21 in Fig. 10, which bar 55 is secured to the form 21 by bolts 56 at intervals therealong. The bolts 56 have inward projections 57, shown in Fig. 10, as extending laterally in straight lines. These projections 57 will protrude through the adjacent concrete rib formed in the molded slab and form therein bolt holes which may be used to bolt the slab to a similarly formed adjacent slab when these are erected in a building. If desired, the tubes 54 may be slipped over projections 57 instead of being disposed loosely between opposed portions of the form and will be molded in the ribs of the slab.

The angle bracket 23 on the side form 21 would be provided with a concave groove 58 therein to interfit a half-round member similar to that shown at 55 when the forms are fitted together as illustrated in Fig. 1.

The form shown in Fig. 11 is similar to that shown in Fig. 10, except that it is provided with a concave groove 59 in the upright section thereof, which may be used to cast a rib on the molded slab, or to receive a pipe 60 that will cast a concave groove in an edge of the molded slab. The pipe 60 is secured in the groove 59 by screw bolts 61 spaced at intervals therealong which are threaded through the upright section and into the pipe. An anchor bolt 62 may be threaded into the opposite side of the pipe 60 and project outwardly therefrom, being shown as of angular formation, so as to be embedded in the molded concrete and thereby hold the pipe 60 securely at the edge of the molded concrete slab when the latter is formed. The side form may be removed or separated from the pipe on the slab upon removal of screw bolts 61, thereby leaving the pipe securely attached to an edge of the slab. The pipe 60 may be attached directly to the reinforcing rods as by welding, if desired.

It will be evident that a concrete slab having a pipe 60 at a side thereof, may be interfitted with a slab having a concave groove formed by the half-round bar 55, thereby providing a tongue and groove between the abutting edges of adjacent slabs. If the anchor bolts 62 are not used, the pipe 60 may be removed from the edge of the molded slab, thereby leaving a concave groove in the edge thereof, in a manner similar to that provided in Fig. 10.

The form shown in Fig. 12 is substantially the same as that shown in Fig. 11, except that the pipe 60 is removed, so that when the concrete slab is molded, the concrete will fill the longitudinal concave groove 59, thereby forming a tongue directly on the edge of the concrete slab which is adapted to interfit with a complementary groove in an adjacent slab. Bolts are shown at 63 having straight projections from the inner ends thereof, that may be used to form recesses in the molded slab for receiving bolts or other fastening means.

These groove or rib forming portions may be used on any of the side forms as desired, as is illustrated for instance, in Figs. 13 and 14, as applied to the respective side forms 20 and 19, both showing the round pipe secured along the edge of the side form to mold a concave groove in the edge of the slab formed thereby.

Fig. 19 is an enlarged perspective view showing the manner in which the flange 32 of the side mold form 20 fits in abutting relation with the edge of the mold plate 7 with upstanding projection 32' retaining the flange 32 in contact relation with the machined edge of the mold plate 7. The flange 32 will hold the side mold form 20 at right angles, at all times, to the fixed side mold form 19, as will best be seen in Figs. 1 and 2.

In Figures 20, 21, and 22 of the drawings the mold table 80 is mounted on rocker elements 97, which may be made of T-iron or the like. One end of the rocker element 97 is secured to a channel member 98 and the other end is secured to an H-beam 99 positioned under the frame members 101. Longitudinal frame members 101 are positioned underneath the molding plate 87 which plate is secured thereto and to the channel members 98 by studs 102 welded to the under side of the molding plate 87 and passing through the flanges of the structural members. The frame members may be reinforced by additional structural members 103 which may be welded between the transverse frame members 100.

With the channel members 98, as is best seen in Figs. 20–22, positioned at the outer ends of the transverse members 100 and secured thereto as by welding, and secured to the molding plate 87, a very strong molding table structure is obtained, which is necessary in handling heavy concrete slabs.

The mold table 80 leveled in the horizontal position by supports 104 which have jack screw members 105 thereon by means of which the table is made accurately level, as is necessary for the forming of the slab. A pair of eyes 106 is provided for attachment of a cable, in a manner similar to that shown in Fig. 7.

This modified form of mold table is designed to roll upward on rockers 97 from the horizontal position to the upright position, for the removal of the slabs that are to be removed in the upright position.

In using the molding apparatus as shown in Figs. 1 to 7, to mold concrete slabs, the molding table 1 is turned to its horizontal position as illustrated in full lines in Figs. 3 and 4. The side forms 20—22 are adjusted to the proper relation according to the size and shape of the slab to be molded, and these side forms are then secured together in their adjusted positions by the C-clamps 24, in such way that there will be no spreading or displacement of the forms. The side mold form 19 is rigidly fixed to the molding plate 7, and the other side mold forms may be secured rigidly to the plate 7 by C-clamps 33 and 33', and by magnetic clamps 34—36. Thus the side forms enclose a cavity upon the molding plate 7.

The plate is covered alternately with rows of furring strips 40 and molding pans 37, until the entire surface of the form is covered thereby, unless it is desired to mold one or more window or door openings, as hereinafter described. In the latter event, the furring strips and molding pans will be arranged alternately to fill all surface space not occupied by the window or door frames.

After the furring strips and molding pans are secured in place, the reinforcing rod supports 44 may be driven into the furring strips at spaced points therealong, if the reinforcing unit is not previously assembled, as described above, the prongs of the staple projection 45 spreading against the contact surface of the molding plate 7, so that they will be clinched securely to the furring strips. This serves both to support the members 44 in the mold during the molding operation and also to anchor the furring strips to the molded slab after it is formed. The reinforcing rod 41 and rod 42 are then applied to the supports 44 and are secured thereto by bending in the portions 47 and 48 thereof around the reinforcing rods.

The tubes 54 may then be inserted in recesses 37' at proper intervals between the pans as well as between the outermost pans and the adjacent side forms in such positions as to mold the desired bolt holes or passageways in the ribs of the slab, according to the number and position of these desired. If it is desired to use a wire mesh screen as a further reinforcing for the web of the molded slab, this may be applied over the reinforcing rods 41 and 42 as indicated at 43 in Fig. 4, and secured to the reinforcing rods in spaced relation to the surface of the pans.

The transverse reinforcing rods 42 are shown to have and preferably are provided with the nuts 49, which should be so disposed at the edge of the mold cavity that the threaded recesses in the nuts will be exposed at the lateral face of the molded slab, to permit the attachment of a sling device 50—53 (Fig. 6) to the slab after it is formed.

With the mold form constructed as desired, it is ready to receive the concrete which is poured therein to cover the enclosed parts and to fill the cavity to the desired height. The concrete slab should be poured so that it will fill all of the space within the side forms. The spreading of the concrete in this space may be facilitated by a vibrating action applied to the mold form and which may be imparted thereto either manually or by mechanical means. I have shown, and prefer to use for this purpose, electrical vibrators generally designated and illustrated at 64 in Fig. 5, which are positioned beneath the molding plate 7 and operated electrically so as to cause this plate to vibrate, whereby the liquid concrete will spread out as it is poured and fill all of the space around the reinforcing rods, pans and other parts within the mold cavity, thereby insuring a slab of uniform density. The detailed construction of these vibrators need not be illustrated as they are well known and any desired form thereof may be used for the purpose.

While the invention is shown as using furring strips of wood which will thereby cover the edges of the ribs on the molded concrete slab and provide nailing surfaces thereon, if it is not required that such nailing surface be used, short metal spacers, or metal reinforcing bars running the entire length of the slab, as shown at 78 in Fig. 5, may be substituted for the wooden furring strips to hold the pans in spaced relation. The concrete would then be poured directly upon the molding plate 7 which will provide a smooth lower surface. Such metal strips will also give greater strength to the ribs of the slab, and is particularly desirable when the latter is to be used in forming a floor structure.

After the concrete has been poured into the mold cavity, as shown in Fig. 4, and has partially set, and if the slab is to be used in an upright position, the molding table 1 should be moved from the horizontal position illustrated in full lines in Fig. 7 to the broken line position shown therein, by the cable device 12—14 attached to the eye 15 at the edge of the table. The bolts 17 will then engage in the holes 16 to hold the table in an upright position where it will be retained during the removal of the molded slab therefrom.

The side mold form 21 may then be removed from the mold plate 7, which will expose the nuts 49 at an edge of the molded slab. The sling device 50—53 (Fig. 6) may then be attached to the nuts 49 for supporting the molded slab after separation from the molding plate. The pans 37 will be removed from the slab as the latter is separated from the molding plate or thereafter. The slab may then be transported to a suitable rack where it will be retained until completely cured and ready for use in a building. A number of slabs may be supported in the rack in side-by-side relation for curing, and transported, preferably in vertical position if the slab is to assume a vertical position in the building, to the point of use. The preferred handling of the floor and ceiling slabs in a horizontal position has been described heretofore.

These slabs may be formed into wall panels, floor or ceiling or roof sections, from which a building of planned design may be constructed on the prefabricated principle. Where a number of different slabs that are alike are to be molded one after another, this may be done without the necessity for readjusting the mold. Likewise, slabs of the same size may be molded with the same side form adjustment and will be interchangeable, or with changes as desired in the frames, tubes, etc. Thus the molding apparatus is adaptable to the molding of multiple sections, either the same or different sizes and character, readily and efficiently.

Figure 17:
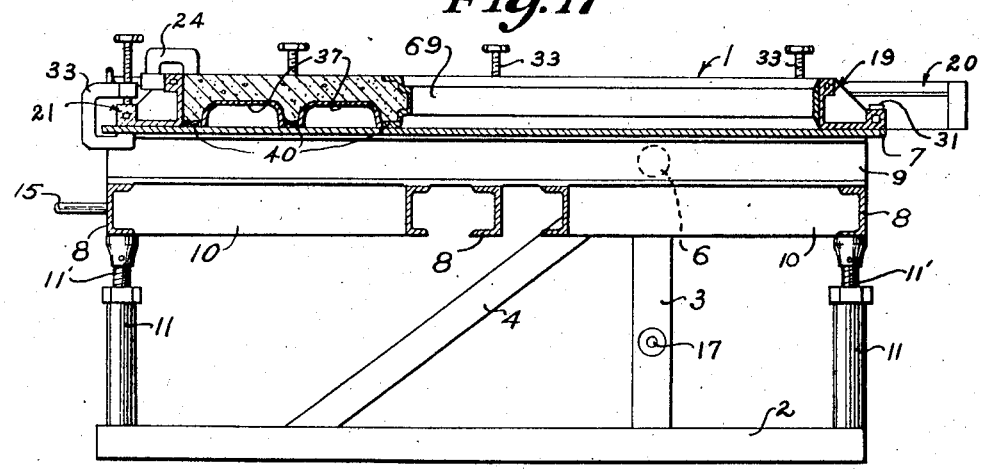
Fig. 17 is a cross section therethrough on the line 17—17 of Fig. 16.
Figure 18:
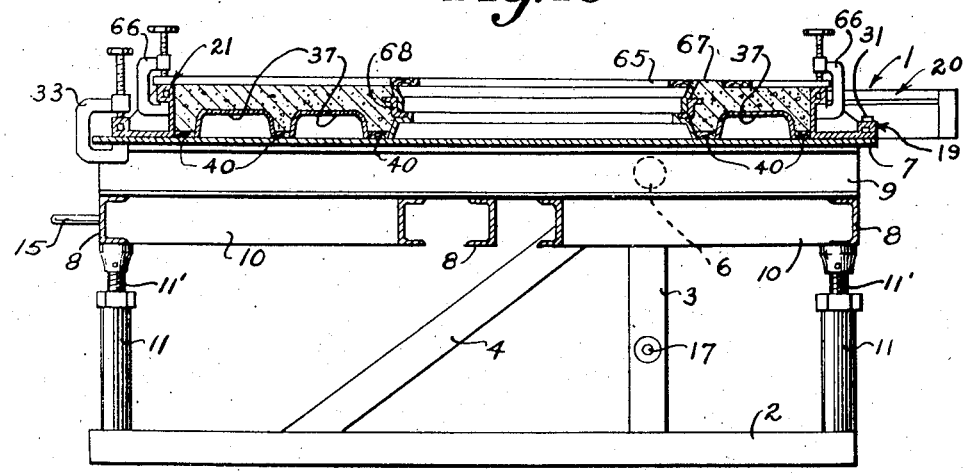
Fig. 18 is a similar view on the line 18—18 of Fig. 16.

As mentioned above, the invention may be used either to mold slabs of uniform character with recesses in a surface thereof, uniformly disposed over the area of each slab to lighten the weight and for other advantageous purposes, or window or door openings may be formed therein as desired. Such openings are illustrated in Figs. 16 to 18. As shown in Fig. 16, form members are adapted to be clamped above the top of the side forms 19—22 by means of C-clamps 66 or other fastening means, in such manner that an especially raised portion, such as a window ledge, indicated at 67, may be formed thereby.

In forming window or door openings, the frame thereof, indicated at 68 and 69, respectively, may be cast directly in the concrete slabs, as shown in Figs. 16 to 18, being arranged in alternating relation with the molding pans 37, as will be evident therein. In the use of such frames, the concrete will fill the space between the forms and the adjacent side forms, thus molding the slab therearound and securely anchoring the frame thereinto. A threshold 69', preferably made of metal and attached to reinforcing rods, may be positioned across the bottom of door opening 69 to reinforce depending wall sections on either side of the door opening.

I claim:

1. In an apparatus for casting prefabricated cementitious building slabs of substantially wall size, said apparatus being readily variable for the production of slabs of widely differing dimensions, in combination, a mold table of an area to accommodate the largest slab contemplated, said mold table having a side form projecting upwardly therefrom adjacent one edge, means fixedly securing said frame to said table, an adjacent side form disposed upon the table in abutting relation to said first named side form, cooperating guide means on the table and said second side form at or near the opposite ends of said second side form for maintaining said second form continually at right angles to said first named form while permitting sliding adjustment of the second form to and from a multiplicity of positions of operation in the direction of its length only, a third side form disposed on said table opposite to and parallel with the first named side form and adjacent to and in abutment with said second named side form, and a fourth side form disposed upon the surface of the table adjacent to and in abutment with said first and third side forms, and means for positioning said third and fourth side forms to accurately complete a rectangular mold recess upon the mold table.

2. In an apparatus for casting prefabricated cementitious building slabs of substantially wall size, said apparatus being readily variable for the production of slabs of widely differing dimensions, in combination, a mold table of an area to accommodate the largest slab contemplated, said mold table having a side form projecting upwardly therefrom adjacent one edge, means fixedly securing said side form to said table, an adjacent side form disposed upon the table in abutting relation to said first named side form, cooperating aligning means on said table and said second side form disposed substantially throughout the length of said second side form for maintaining said second form continually at right angles with said first named form, while permitting sliding adjustment thereof to and from a multiplicity of positions of operation in the direction of its length only, a third side form disposed on said table opposite to and parallel with the first named side form and adjacent to and in abutment with said second named side form, and a fourth side form disposed upon the surface of the table adjacent to and in abutment with said first and third side forms, and means for positioning said third and four side forms to accurately complete a rectangular mold recess upon the mold table.

3. In an apparatus for casting prefabricated cementitious building slabs of substantially wall size, said apparatus being readily variable for the production of slabs of widely differing dimensions, in combination, a mold table of an area to accommodate the largest slab contemplated, said mold table having a side form fixed thereto and projecting upwardly therefrom, an adjacent side form disposed upon the table in abutting relation to said first named side form, cooperating guide means on the table and said second side form at or near the opposite ends of said second side form for maintaining said second form continually at right angles to said first named form while permitting sliding adjusting of the second form only in the direction of its length, a third side form disposed on said table opposite to and parallel with the first named side form and adjacent to and in abutment with said second named side form, and a fourth side form disposed upon the surface of the table adjacent to and in abutment with said first and third side forms, and means for positioning said third and fourth forms in relation to the other forms to accurately complete a rectangular mold recess upon the mold table, said last named means including linear scale graduations on all of said side forms adjacent the edges thereof along which the mutual abutment of the contiguous forms occur, whereby assuming the fixed angularity of the first two forms the rectangular mold recess may be completed by the adjustment of the second, third, and fourth forms in their several directions of movement in accordance with the dimensions read upon the scales.

4. The apparatus as set forth in claim 1 in which the table is provided with clamps along one edge thereof for securing said second side form, and also with magnetic clamps for securing the third and fourth side forms to the top surface of the mold table, in any of their positions of adjustment.

5. In an apparatus for casting cementitious building slabs of substantially wall size, a mold table, adjustable side forms secured to said table to provide a slab mold recess thereon, a framework for supporting said table substantially adjacent to an axis about which said table may be tilted, said framework being so constructed and arranged as to tiltably support said table, a plurality of vertically adjustable supplemental supporting means for said table disposed at spaced points throughout the under surface of said table, means for individually adjusting said supporting means to insure the leveling of the whole area of the mold, whereby during the initial setting of the slab it may be maintained in an accurately horizontal plane throughout its area, and then raised to an upright position as for transportation or installation.

6. An apparatus for prefabricating cementitious building slabs comprising, in combination, a mold table, adjustable and removable side forms on said table providing a mold recess, a supporting framework for said table comprising rockers provided at one edge of the table and spaced from each other and each inset a substantial distance from the edges adjacent to said first named edge, means for lifting an edge of said table opposite to that at which the rockers are disposed so as to rock the table upon said rockers to an upright position, and a plurality of individually adjustable supporting means for supporting portions of said table at points spaced from said rockers, whereby during the initial setting of the slab it may be maintained in a horizontal plane throughout its area, and afterward raised to a substantially vertical position as for transportation or installation.

7. In an apparatus for casting prefabricated cementitious building slabs of substantially wall size, said apparatus being readily variable for the production of slabs of widely differing dimensions, in combination, a mold table of an area to accommodate the largest slab contemplated, said mold table projecting upwardly therefrom adjacent one edge, means fixedly securing said side form to said table, an adjacent side disposed upon the table in abutting relation to said first named side form, spaced cooperating vertically extending flange elements on the table and on said second side form at or near the opposite ends of said second side form to provide guide means for maintaining said second side form continuously at right angles to said first named side form while permitting sliding adjustment of the second side form to and from a multiplicity of positions of operation in the direction of its length only, a third side form disposed upon said table opposite to and parallel with the first mentioned side form and adjacent to and in abutment with said second named side form, and a fourth side disposed upon the surface of the table adjacent to and in abutment with said first and third side forms, said third and fourth side forms being freely movable in all directions upon the surface of the table during adjustment, and means for securing said third and fourth side forms in position to accurately complete a rectangular mold recess upon the mold table.

8. The apparatus as set forth in claim 1 in which there are provided clamps for securing the third and fourth side forms to the top surface of the table in any of their positions of adjustment, and adapted to be secured to the table top at any desired point thereon without modifying or perforating said table top.

9. An apparatus for prefabricating cementitious building slabs of substantially wall size comprising, in combination, a mold table having a mold recess therein, a supporting framework for the table including two or more rocker legs extending downwardly from one edge of the table, said rocker legs having a substantially vertical straight line outer edge surface adjacent said edge of the table and a 90° arc portion connecting said straight portion with the foot of said leg, and means for raising the remote edge of the table to rock the table to a stable upright position upon said straight line portion of the rocker leg.

JOHN HART WILSON.

REFERENCES CITED

The following references are of record in the file of this patent:

UNITED STATES PATENTS

| Number | Name | Date |
|---|---|---|
| 2,382,626 | Gaston | Aug. 14, 1945 |
| 2,306,548 | Leemhuis | Dec. 29, 1942 |
| 1,903,356 | Bitney | Apr. 4, 1933 |
| 2,235,001 | Allen | Mar. 18, 1941 |
| 2,253,730 | Seailles | Aug. 26, 1941 |
| 1,983,757 | Hick | Dec. 11, 1934 |
| 1,922,168 | Lowell | Aug. 15, 1933 |
| 2,161,822 | Kogl | June 13, 1939 |
| Re. 12,580 | Hamm | Dec. 18, 1906 |
| 896,330 | Scheelky | Aug. 18, 1908 |
| 2,306,107 | Henderson | Dec. 22, 1942 |
| 2,306,548 | Leemhuis | Dec. 29, 1942 |
| 790,697 | Mason | May 23, 1905 |
| 815,098 | Klay | Mar. 13, 1906 |
| 833,952 | Brown | Oct. 23, 1906 |
| 1,023,349 | Aiken | Apr. 16, 1912 |
| 1,516,672 | Franz et al. | Nov. 25, 1924 |
| 2,297,923 | Strong et al. | Oct. 6, 1942 |
| 2,340,972 | Matthews | Feb. 8, 1944 |

FOREIGN PATENTS

| Number | Country | Date |
|---|---|---|
| 504,884 | French | 1920 |
| 3,982 | Australian | Sept. 25, 1926 |